United States Patent
Kameya (10) Patent No.: US 6,868,933 B2
(45) Date of Patent: Mar. 22, 2005

(54) VARIABLE TRANSMISSION-RATIO STEERING APPARATUS

(75) Inventor: Hisashi Kameya, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/839,154

(22) Filed: May 6, 2004

(65) Prior Publication Data

US 2004/0222033 A1 Nov. 11, 2004

(30) Foreign Application Priority Data

May 7, 2003 (JP) ......................................... 2003-129559

(51) Int. Cl.$^7$ ................................................ G60F 7/00
(52) U.S. Cl. ........................................ 180/404; 701/41
(58) Field of Search ............................... 180/404, 405, 180/446, 444, 443; 701/41

(56) References Cited

U.S. PATENT DOCUMENTS 6,718,242 B1 * 4/2004 Mori et al. .................. 701/401
2003/0201136 A1 * 10/2003 Ueno et al. .................. 180/443

FOREIGN PATENT DOCUMENTS

JP 2001-278087 10/2001

* cited by examiner

Primary Examiner—Lesley D. Morris
Assistant Examiner—Tony Winner
(74) Attorney, Agent, or Firm—Posz & Bethards, PLC (57) ABSTRACT

A variable transmission-ratio steering apparatus comprises an input shaft coupled to a steering wheel, an output shaft operatively coupled to steerable road wheels. The apparatus comprises an electric motor varying a rotation angle of the output shaft by providing a drive force to the output shaft, the drive force being decided based on a rotation angle of the input shaft, a lock member locking the input shaft to the output shaft in an unlockable manner, and an excitation coil enabling the lock member to be actuated to unlock a lock between the input and output shafts. The apparatus further comprises a unit controlling current to be supplied to the excitation coil and a unit detecting abnormality of the excitation coil based on both of a command value of current to flow through the excitation coil and a value of the current actually flowing through the excitation coil.

19 Claims, 6 Drawing Sheets

VARIABLE TRANSMISSION-RATIO STEERING APPARATUS

BACKGROUND OF THE INVENTION

1. (Technical Field)

The present invention relates to a variable transmission-ratio steering apparatus capable of varying the transmission ratio of a steering force transmitted from a vehicle's steering wheel to vehicle's wheels to be steered.

2. (Related Art)

Most vehicles are provided with a variable transmission-ratio steering apparatus. One of such apparatuses is proposed by Japanese Patent Laid-open (KOKAI) publication No. 2001-278087.

This variable transmission-ratio steering apparatus has, in addition to an input shaft coupled to a vehicle's steering wheel and an output shaft coupled to vehicle's steerable road wheels, an electric motor, a lock pin, an excitation coil composed of a solenoid coil, and a controller.

Of these, the electric motor is driven in response to electric current to be supplied so that a driving force is transmitted to the output shaft, thus varying the rotation angle of the output shaft. The lock pin is disposed to mutually link, as one unit, the input shaft and the output shaft in a controlled connection/disconnection manner. The excitation coil is disposed to actuate the lock pin to stop the linkage between the input and output shafts. Moreover, the controller is in change of controlling the drive of both of the electric motor and the excitation coil.

However, in case that the excitation coil has abnormality which spoils its functions, the lock pin could not be actuated, in which the linkage between the input and output shafts is kept and no longer unlocked. In this situation in which the linkage is maintained, the controller operates to keep supplying current to the electric motor. This causes undesirable effects, such as overheat or burnout of coils, on the electric motor.

SUMMARY OF THE INVENTION

The present invention has been made with due consideration to the foregoing difficulty, and an object of the present invention is to provide a variable transmission-ratio steering apparatus that is free from damaging an electric motor incorporated therein, in cases where abnormality occurs at an excitation coil in a transmission ratio variable unit incorporated in the apparatus.

In order to accomplish the above object, the present invention provides a variable transmission-ratio steering apparatus comprising an input shaft coupled to a steering wheel, an output shaft operatively coupled to steerable road wheels, an electric motor, a lock member, and an excitation coil. The electric motor varies a rotation angle of the output shaft by providing a drive force to the output shaft, the drive force being decided based on a rotation angle of the input shaft. The lock member locks the input shaft to the output shaft in an unlockable manner. The excitation coil enables the lock member to be actuated to unlock a lock between the input and output shafts. The apparatus further comprises a control unit and an abnormality detecting unit. The control unit controls current to be supplied to the excitation coil. The abnormality detecting unit detects abnormality of the excitation coil on the basis of both of a command value of current to flow through the excitation coil and a value of the current actually flowing through the excitation coil.

It is preferred that the apparatus further comprises an abnormality-avoiding unit avoiding the abnormality of the excitation coil when the abnormality detecting unit detects the abnormality of the excitation coil.

Accordingly, the abnormality detecting unit is able to detect abnormality which may occur at the excitation coil, so that the abnormality-avoiding unit is able to perform an appropriate countermeasure against the detected abnormally. The countermeasure includes stopping a drive of the electric motor, which makes it possible to avoid current from flowing through the excitation coil for a long time. Hence, an unwanted damage to the electric motor, such as overheating thereof, can be prevented without fail.

It is still preferred that the variable transmission-ratio steering apparatus comprising a power-supply voltage detecting unit detecting a voltage value of a power source to supply the current to the excitation coil. In this case the control unit comprises a supply unit supplying the current to the excitation coil, the current having a duty ratio decided, on the basis of the voltage value of the power source, to allow the current of the command value to flow through the excitation coil.

Preferably, the abnormality detecting unit has a resistor electrically coupled to the excitation coil and a calculating unit calculating the value of the current actually flowing through the excitation coil on the basis of a voltage value detected by the resistor.

Still preferably, the abnormality detecting unit has a calculation unit deciding a normal range of the current actually flowing through the excitation coil on the basis of the current of the command value and determine that the excitation coil is abnormal in cases where the value of the actually flowing current falls out of the normal range.

It is preferred that the control unit includes a switching transistor for controlling the current to flow through the excitation coil and the abnormality-avoiding unit includes means for turning off the switching transistor when the abnormality detecting unit detects the abnormality of the excitation coil.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described.

Referring to FIGS. 1 to 7, an embodiment of a variable transmission-ratio steering apparatus according to the present invention will now be described.

Figure 1:
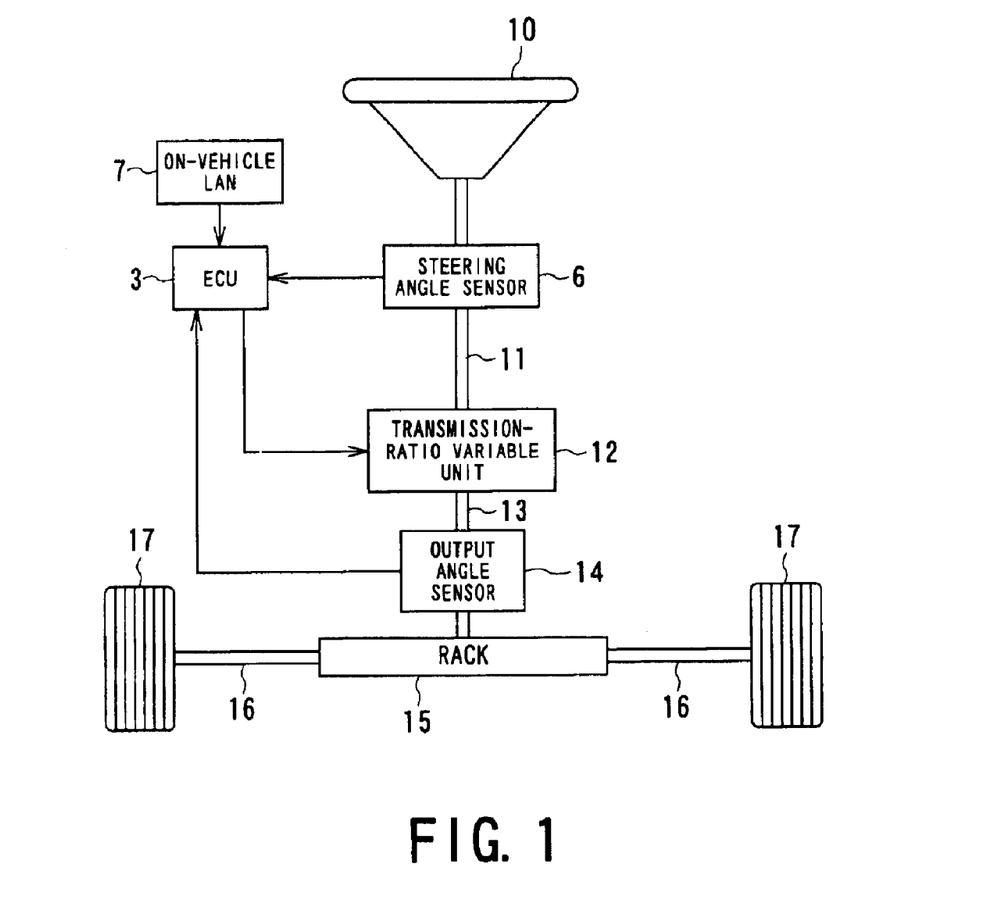
FIG. 1 shows the overall configuration of a transmission-ration-variable steering apparatus arranged in a vehicle.

FIG. 1 shows the entire configuration of a variable transmission-ratio steering apparatus 1 according to the embodiment. This steering apparatus 1, which is shown in FIG. 1 as part of a steering mechanism of a vehicle, is in charge of varying a steering angle of steerable road wheels depending on speeds of the vehicle.

As shown in FIG. 1, the variable transmission-ratio steering apparatus 1 is provided with, as control-system components, an ECU (Electrical Control Unit) 3, an on-vehicle LAN 7, a steering angle sensor 6 and an output angle sensor 14. In addition, the steering apparatus 1 is also provided with, as mechanical components, an input shaft 11, a transmission-ratio variable unit 12, and an output shaft 13.

In the vehicle, as shown in FIG. 1, the upper end of the input shaft 11 is coupled to a steering wheel 10. The transmission-ratio variable unit 12 is disposed to mutually link both of the lower end of the input shaft 11 and the upper end of the output shaft 13. The lower end of the output shaft 13 is connected with a not-shown pinion engaging with a rack 16 arranged within a steering gear box 15. Both ends of the rack 16 are respectively coupled to steerable road wheels 17 via tie rods and knuckle arms (not shown).

On the input shaft 11, the steering angle sensor 6 is provided, which detects a steering angle given by the steering wheel 10. Further, on the output shaft 13, the output angle sensor 14 is provided to detect the steered angle of the steerable road wheels 17. Signals indicting both the steering angle and the steered angle are supplied from both the steering angle sensor 6 and the output angle sensor 14 to the ECU 3. In addition to those signals from the sensors 6 and 14, this ECU 3 also receives from the on-vehicle LAN 7 both of a signal indicative of a vehicle speed (vehicle speed signal) and a further signal indicative of the number of rotations of a vehicle engine (engine rotation number signal). The ECU 3 is placed to generate a control signal for controlling the transmission-ratio variable unit 12.

Figure 2:
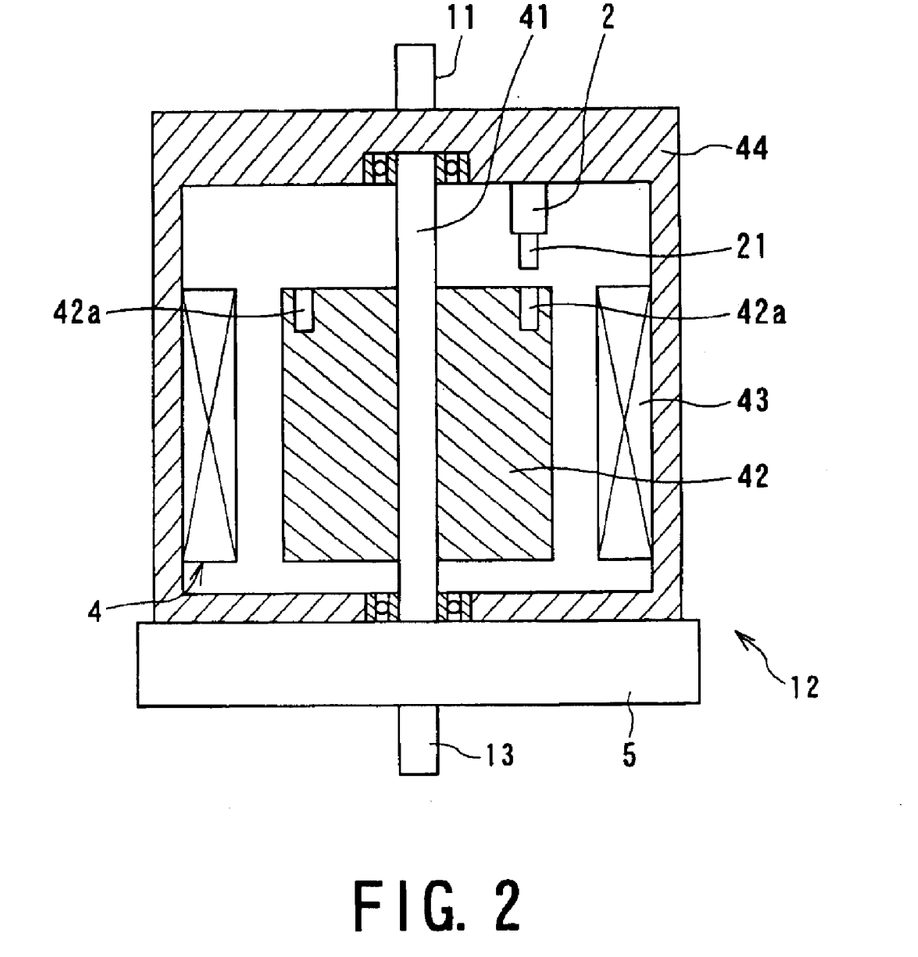
FIG. 2 shows an axial sectional view of a transmission ratio variable unit incorporated in the transmission-ratio-variable steering apparatus.

The transmission-ratio variable unit 12 is configured as shown in FIG. 2, in which there is provided with an electric motor 4 composed of a well-known brushless motor and a reduction mechanism 5. Using the signals from the steering angle sensor 6 and the on-vehicle LAN 7, the unit 12 is able to drive the electric motor 4 to allow the output shaft 13 to rotate to vary its rotation angle. The electric motor 4 is arranged within in a motor housing 44 and is equipped with a stator 43 and a rotor 42. On the inner steering-wheel-side circumferential surface of the motor housing 44, there is provided with a solenoid coil 2 to enable a lock pin 21 to retractably advance in a direction parallel to the axis of a rotation shaft 41. The lock pin 21 composes link means. In response to a command issued from the ECU 3, the solenoid coil 2 will cause the lock pin 21 to step back in the direction parallel to the rotation shaft 41. Engaging holes 42a, which can be engaged with the lock pin 21, are recessed on one of both ends.

In this variable transmission-ratio steering apparatus 1, inputted to the ECU 3 are the vehicle speed signal and the engine rotation number signal, which are from the on-vehicle LAN 7 and the signal indicating a steering angle, which is from the steering angle sensor 6. When those signals are given, the ECU 3 uses those signals to compute a target steering angle. In response to this computed target steering angle, the ECU 3 issues a motor control command to be sent to the transmission-ratio variable unit 12. This motor control command allows the electric motor 4 of the unit 12 to be driven, thus providing the steerable road wheels 17 with a steered angle corresponding to the target steering angle.

The ECU 3 then reads in a signal indicating an actually steered angle of the steerable road wheels 17 which is detected by the output angle sensor 14, and the detected signal is fed back to the control so that the steered angle depending on the target steering angle can be given to the steerable road wheels 17 in a steady manner. During this control, the solenoid coil 2 is in an ON state, so that the lock pin 21 is made to step back in the direction parallel to the rotation axis 41. Namely the motor housing 44 is separated from the rotor 42.

In addition, when the ECU 3 detects an abnormal state of the transmission-ratio variable unit 12 (for example, the grounding of the solenoid coil 2), the ECU3 provides the solenoid coil 2 with a command to prohibit current from flowing through the solenoid coil 2. This control will prohibit current flow through the solenoid coil 2, whereby the lock pin 21 is made to advance forward in the direction parallel to the rotation shaft 41. The lock pin 21 is therefore forced to engage with one of the engaging holes 42 recessed on the rotor 42, thereby both of the motor housing 44 and the rotor 42 are coupled with each other.

In the present embodiment, the abnormal state (or abnormality) of the unit 12 is directed to that of the solenoid coil 2. The abnormality of the solenoid coil 2 is defined as a situation where the solenoid coil 2 is out of order in terms of its functions. By way of example, the abnormality of the solenoid coil 2 includes the grounding or floating thereof and breaking of wires electrically connected to or from the solenoid coil 2.

Figure 3:
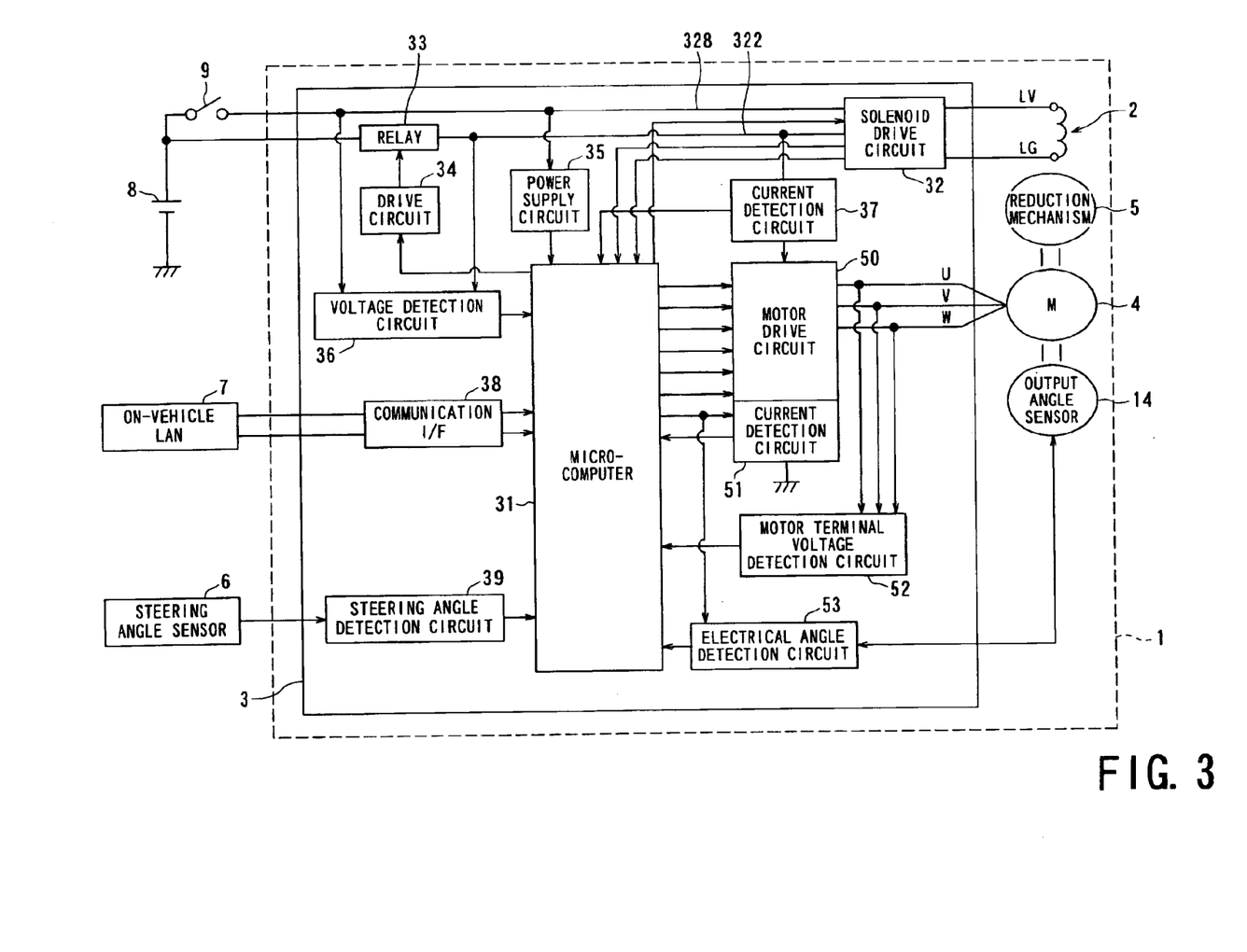
FIG. 3 is a block diagram showing the overall electric circuitry of the steering apparatus.

With reference to FIG. 3, the variable transmission-ratio steering apparatus 1 will now be explained in terms of its electric configuration.

As described, the variable transmission-ratio steering apparatus 1 is provided with the solenoid coil 2, ECU 3, electric motor 4 and reduction mechanism 5.

The solenoid coil 2, which corresponds to the excitation coil, is connected with a solenoid drive circuit 32 of the ECU 3. Though being described in detail later, the solenoid drive circuit 32 generates a PWM (pulse-width modulation) signal that passes the solenoid coil 2 in order to actuate the lock pin 21.

The ECU 3, which composes a control unit, is configured to use information given by both the steering angle sensor 6 and the on-vehicle LAN 7 to control current flowing through both the solenoid coil 2 and the electric motor 4. Practically, the ECU 3 is equipped with a microcomputer 31, solenoid drive circuit 32 described above, relay 33, drive circuit 34, power supply circuit 35, voltage detection circuit 36, current detection circuit 37, communication I/F 38, steering angle detection circuit 39, motor drive circuit 50, current detection circuit 51, motor terminal voltage detection circuit 52 and electrical angle detection circuit 53.

Using signals from both of the steering angle sensor 6 and the on-vehicle LAN 7, the microcomputer 31 generates a PWM signal for, controlling in a duty ratio current flowing through the electric motor 4. Furthermore, using signals from both of the steering angle sensor 6 and the on-vehicle LAN 7, the microcomputer 31 calculates a command value of current to be given to the solenoid coil 2. The microcomputer 31 generates the PWM signal to duty-control, based on the voltage of the battery 8, an actual current passing through the solenoid coil 2 so that the actual current is made to be equal to its command value.

The voltage of the battery 8 fluctuates, not always constant. One countermeasure to cope with this is to control the duty ratio of the PWM signal depending on the voltage of the battery 8. By way of example, when the voltage of the battery 8 is low, the microcomputer 31 generates the PWM signal of which duty ratio is large, whereby the current through the solenoid coil 2 is controlled to the command value.

The solenoid drive circuit 32 responds to the PWM signal from the microcomputer 31 to control in the duty ratio the actual current flowing though the solenoid coil 2, so that the lock pin 21 is actuated. To realize this control, the solenoid drive circuit 32 is connected to the battery 8 via the relay 33. The configuration of this solenoid drive circuit 32 will be detailed later in connection with FIG. 4.

The relay 33, which is placed between the battery 8 and the solenoid drive circuit 32, connects the battery 8 and the circuit 32 when the relay 33 is brought into an ON state. In contrast, when the relay 33 is brought into an OFF state, the relay 33 disconnects the solenoid drive circuit 32 from the battery 8.

The drive circuit 34 operatively intervenes between the microcomputer 31 and the relay 33 and receives a signal from the microcomputer 31. When receiving the signal, the drive circuit 34 turns ON or OFF the relay 33.

Further, the power supply circuit 35, which is connected to the battery 8 via an IG (ignition) switch 9, supplies the battery 8 with current from the battery 8.

The voltage detection circuit 36 is placed to detect the voltage of the battery 8 and provides the microcomputer 31 with a signal indicative of the detected voltage.

The current detection circuit 37 is placed between the battery 8 and the motor drive circuit 50 to supply the motor drive circuit 50 with current from the battery 8. Concurrently, the current detection circuit 37 detects a value of the current from the battery 8 to the motor drive circuit 50 and gives the microcomputer 31 a signal indicative of the detected current value.

The communication I/F 38 is placed between the on-vehicle LAN 7 and the microcomputer 31, as shown in FIG. 3. Hence the communication I/F 38 converts both the vehicle speed signal and the engine rotation number signal into appropriate formats adaptable to the microcomputer 31. After the conversions, the vehicle speed and engine rotation number signals are fed to the microcomputer 31.

In the similar way to the above, the steering angle detection circuit 39, which is placed between the steering angle sensor 6 and the microcomputer 31, converts the signal sensed by the sensor 6 into an appropriate format adaptable to the microcomputer 31. After the conversion, the steering angle signal is fed to the microcomputer 31.

The motor drive circuit 50, which is connected with the microcomputer 31, current detection circuit 37 and the motor 4, has six switching transistors composing a three-phase bridge circuit. In response to the PWM signal from the microcomputer 31, the six switching transistors in the motor drive circuit 50 are controlled in the duty ratio to drive the electric motor 4.

The other current detection circuit 51 is placed to detect current flowing through the six switching transistors in the motor drive circuit 50 and supplies the microcomputer 31 with a signal indicating the detected current value.

Furthermore, as shown in FIG. 3, the motor terminal voltage detection circuit 52 is placed to detect voltages across the six switching transistors in the motor drive circuit 50. Signals indicating the detected voltages are provided from this circuit 52 to the microcomputer 31.

Connected to the output angle sensor 14 is the electrical angle detection circuit 53. This circuit 53 receives a signal indicting a steered angle from the output angle sensor 14 and converts the signal into an appropriate form adaptable to the minicomputer 31, so that a steered angle signal which has been converted is given to the microcomputer 31.

As a result, the microcomputer 31 gives a PWM signal to the solenoid drive circuit 32, so that this circuit 32 is able to control in the duty ratio an accrual current flowing through the solenoid 2. Responsively to this control, the lock pin 21 is actuated, thus unlocking the lock between the motor housing 44 and the rotor 42. In this unlocked situation, the electric motor 4 is rotated in response to the signals coming from the steering angle sensor 6 and the on-vehicle LAN 7, with the result that the rotation force of the electric motor 4 is transmitted to the output shaft 13 via the reduction mechanism 5. The steerable road wheels 14 are therefore driven to vary their steered angles.

Figure 4:
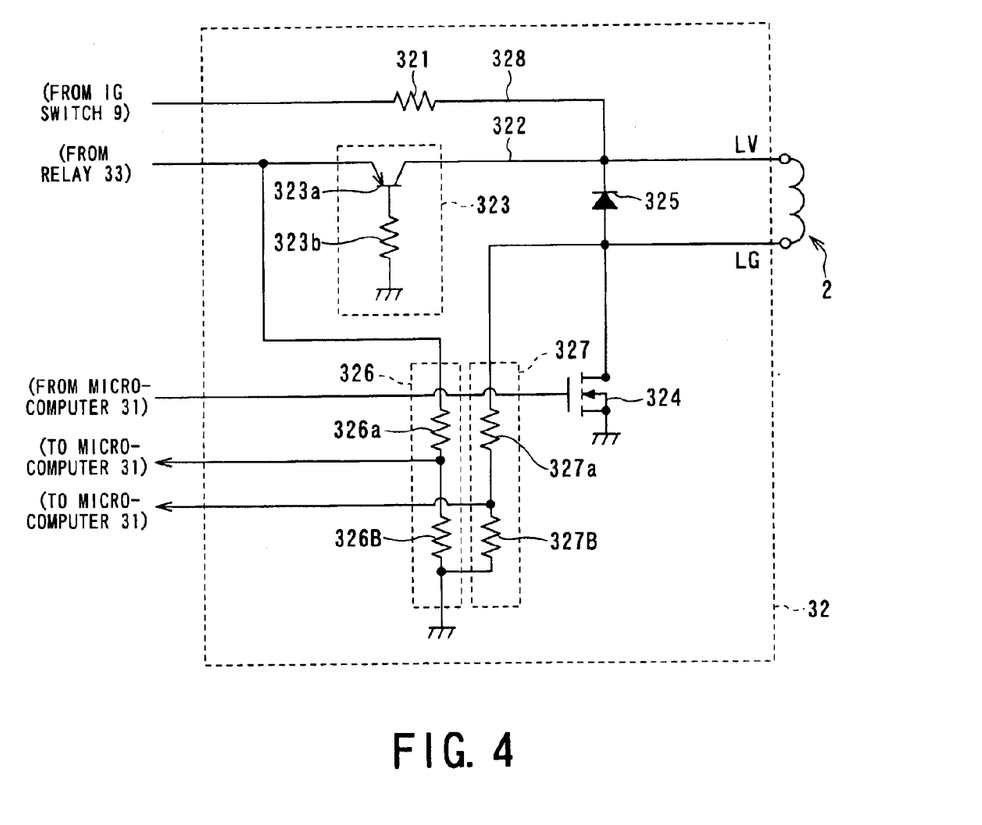
FIG. 4 is a diagram showing the electric circuitry of a solenoid drive circuit.

With reference to FIG. 4, the solenoid drive circuit 32 will be detailed in its constructions and operations.

As shown in FIG. 4, the solenoid drive circuit is provided with a resistor 321, first wiring 322, current limiting circuit 323, switching transistor 324, diode 325, power supply voltage detecting circuit 326, terminal voltage detecting circuit 327, and second wiring 328.

Of these components, the resistor 321 is inserted in the second wiring 328. The first wiring 322 connects one end LV of both ends of the solenoid coil 2 and the battery 8 and is in charge of supplying current to the solenoid coil 2. Hence the solenoid coil 2 is able to actuate the lock pin 21.

The current limiting circuit 323 is placed in the course of the first wiring 322 and provided with a transistor 323a and a resistor 323b. The transistor 323a has an emitter terminal electrically connected to the relay 33, a collector terminal electrically connected to the one end of the solenoid coil 2, and a base terminal electrically connected to the ground via the resistor 323b.

The switching transistor 324 is located to supply current to the solenoid coil 2 depending on a PWM signal corresponding to a command value of current to be supplied to the solenoid coil 2, the command value being decided by the microcomputer 31.

The diode 325 is connected in parallel to both terminals of the solenoid coil 2.

Moreover, as illustrated in FIG. 4, the power supply voltage detecting circuit 326 has a serial connection of resistors 326a and 326b, in which one of the terminals of one resistor 326a is electrically connected to the relay 33 and the other end is electrically connected to one of the terminals of the remaining resistor 326b. The other terminal of the resistor 326b is connected to the ground. The electrically common point to both the resistors 326a and 326b is routed to the microcomputer 31 to have an electrical connection thereto.

The terminal voltage detecting circuit 327 has a serial connection of resistors 327a and 327b. In this circuitry, one of the terminals of one resistor 327a is electrically connected to the remaining end LG of the solenoid coil 2 and the other end is electrically connected to one of the terminals of the remaining resistor 327b. The other terminal of the resistor 327b is connected to the ground. The electrically common point to both the resistors 327a and 327b is routed to the microcomputer 31 to have an electrical connection thereto.

The second wiring 328 is placed to connect the one end LV of the solenoid coil 2 and the battery 8 and is responsible for supplying current from the battery 8 to the solenoid coil 2.

Figure 5:
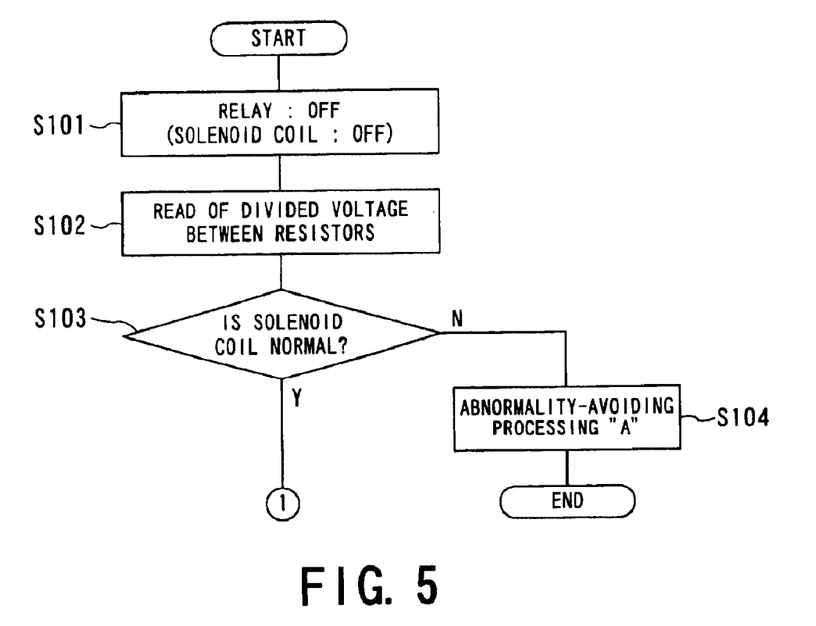
FIGS. 5 to 7 are flowcharts each showing processing for determining an abnormal condition in the solenoid drive circuit.
Figure 6:
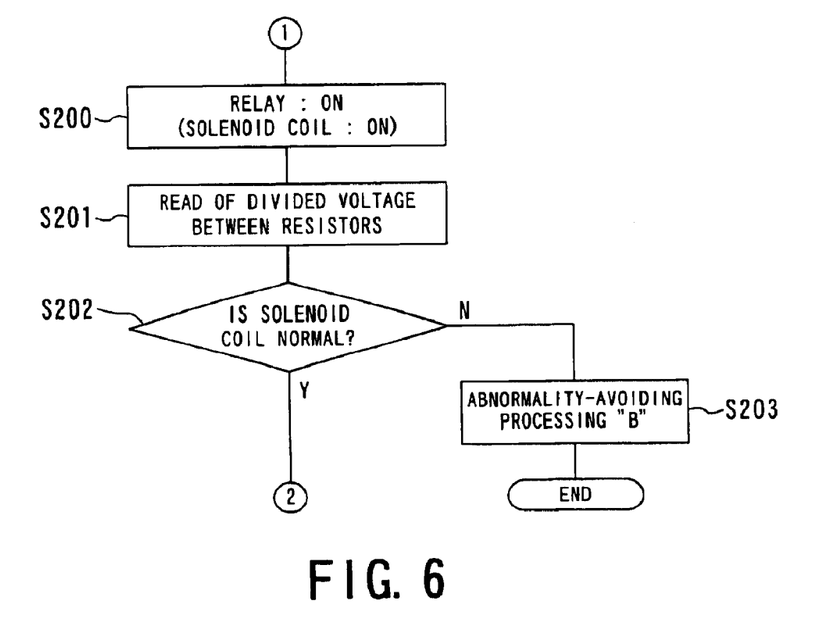
Figure 7:
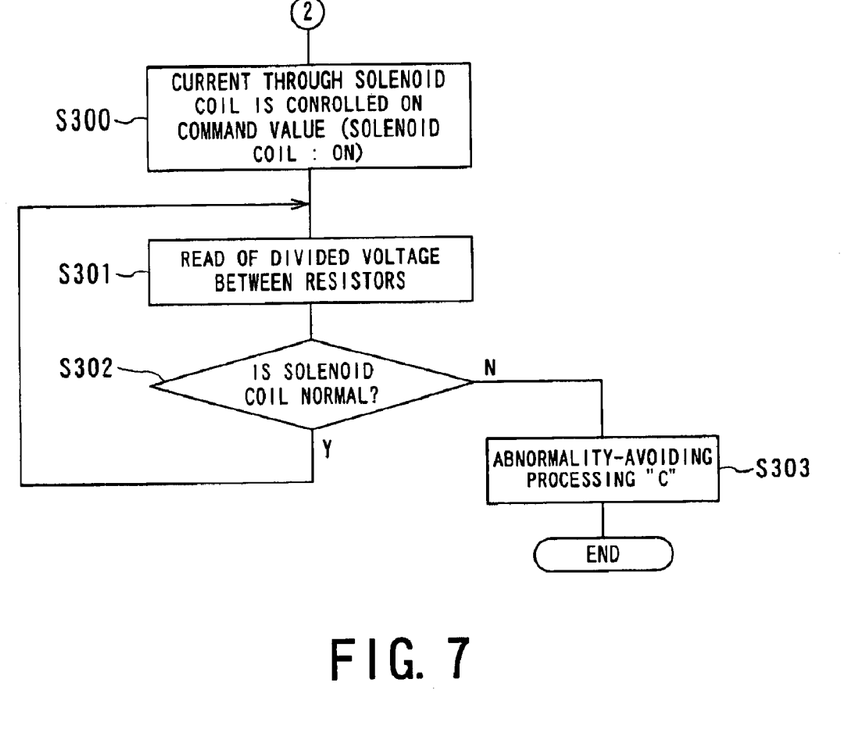

With reference to FIGS. 5 to 7, the processing for avoiding an abnormal condition in the solenoid drive circuit 32 will now be explained. This determination processing is executed by the microcomputer 31.

When the IG switch 9 is turned on by a vehicle driver, the microcomputer 31 receives the power from the battery 8 via the power supply circuit 35 and is activated to sequentially execute the processing shown in FIGS. 5 to 7.

By the way, when the IG switch 9 is turned on, the solenoid coil 2 is electrically connected to the battery 8 to be ready for receiving current therefrom. However, since the resistor 321 is located in the second wiring 328, the resistor 321 operates to limit the current to the solenoid coil 2 down to a low level that is impossible to activate the solenoid coil 2.

First, with reference to FIG. 5, the processing for determining an abnormal condition, which is executed prior to the duty control of an actual current passing through the solenoid coil 2, will now be explained.

In response to turning on the IG switch 9, the microcomputer 31 starts executing the processing shown in FIG. 5.

At step S101 in FIG. 5, the microcomputer 31 controls the relay 33 so that the relay 33 is forcibly turned off to prohibit current from being supplied from the battery 8 to the solenoid coil 2. The microcomputer 31 turns off the switching transistor 324, before advancing its processing to step S102.

At step S102, the microcomputer 31 reads out a terminal voltage Vm across the solenoid coil 2 based on a divided voltage between the resistors 327a and 327b. Then the processing is mad to advance to step S103.

At step S103, the microcomputer 31 uses the read-in terminal voltage Vm to determine whether or not the solenoid coil 2 is in a normal state. When being determined that that solenoid coil 2 is in a normal state, the processing is handed to step S200 shown in FIG. 6. In contrast, when it is determined that the solenoid coil 2 is out of order (i.e., in an abnormal state), the processing is performed at step S104.

In the present embodiment, how to determine some problems which may occur in the solenoid coil 2 is exemplified as follows. When assuming that the terminal voltage of the battery 8 is V1, the terminal voltage Vm across the solenoid coil 2 is subjected to comparison defined by the following condition (1):

$$V1 \cdot \tfrac{1}{4} < Vm < V1 \cdot \tfrac{3}{4} \tag{1}$$

When this condition (1) is met, it is determined by the microcomputer 31 that the solenoid coil 2 is in a normal state. By contrast, if the above condition (1) is not satisfied, that is, the terminal voltage Vm is beyond the comparative condition (1), it is determined by the microcomputer 31 that the solenoid coil 2 is in an abnormal state.

At step S104, one type of abnormality-avoiding processing "A" is executed, as it has been determined that there occurs a problem in the solenoid coil 2.

When the abnormality-avoiding processing "A" is required, the microcomputer 31 memorizes information about what kind of abnormality occurs and issues a command to light up a warning lamp (not shown) of a meter on the vehicle's dashboard. Lighting up such a lamp will notify the vehicle driver of occurrence of the abnormal state in the solenoid coil 2.

In cases where it is determined that the solenoid coil 2 is normal (YES at step S103), the processing is executed at step S200 in FIG. 6. The processing at step S200 allows the microcomputer 31 to provide the drive circuit 34 with a signal to turn on the relay 33. Hence the relay 33 is brought into an ON state, and current is fed from the battery 8 to the solenoid coil 2 via the second wiring 322. The processing is then shifted to step S201.

At step S201, the microcomputer 31 again reads in a divided voltage between the resistors 327a and 327b to examine the terminal voltage Vm across the solenoid coil 2. In this situation, the microcomputer 31 operates not to generate a PWM signal for the switching transistor 324. The processing is then moved to step S202.

When being moved to step S202, the microcomputer 31 determines if or not the read-in terminal voltage Vm meets a predetermined condition, that is, the solenoid coil 2 is normal. If determined to be normal, the processing is shifted to step S300 in FIG. 7, while if determined to be abnormal, the processing is carried out at step S203.

The predetermined condition applied to the above determination is provided by the following expression (2):

$$5[V] < Vm < V1 \tag{2},$$

wherein V1 is a voltage of the battery 8.

Hence, if the actually detected terminal voltage Vm is beyond this condition (2), it is determined by the microcomputer 31 that the solenoid coil is in an abnormal state. If the voltage Vm meets the condition (2), the solenoid coil 2 is normal.

At step S203, another type of abnormality-avoiding processing "B" is executed, as it has been determined that there occurs a problem in the solenoid coil 2. Specifically, the microcomputer 31 orders the relay 33 to turn off, resulting in stopping supplying the current from the battery 8 to the solenoid coil 2. In addition, the microcomputer 31 memorizes information about what kind of abnormality occurs and issues a command to light up a warning lamp (not shown) of a meter on the vehicle's dashboard. Lighting up such a lamp will notify the vehicle driver of occurrence of the abnormal state in the solenoid coil 2.

Then, as part of the routine processing for avoiding the abnormality, the microcomputer 31 executes, as shown in FIG. 7, another type of abnormality-avoiding processing "C" during control of the duty ratio of the actually flowing current through the solenoid coil 2. The duty control is also under the control of the microcomputer 31.

At step S300, to cause current corresponding to the command value to flow through the solenoid coil 2 (i.e., the coil 2 is driven (ON)), the microcomputer 31 gives, to the switching transistor 324 in the solenoid drive circuit 32, a PWM signal decided based on the terminal voltage of the battery 8. Hence the switching transistor 324 controls the duty ratio of an actual current flowing through the solenoid coil 2. Responsively to this control, the lock pin 21 is activated to unlock the connection between the motor housing 44 and the rotor 42, so that the motor housing 44 is free from the rotor 42. The processing is then moved to step S301.

In the present embodiment, the microcomputer 31 is programmed so that, in the case of actuating the lock pin 21 (unlocking), a PWM signal of which duty ratio is 100 percents is sent to the switching transistor 324. After completion of actuating the lock pin 21, the microcomputer 31 gives the switching transistor 324 a PWM signal whose duty ratio is 40 to 80 presents to sustain the actuated state (i.e., the unlocked state) of the lock pin 21.

Then at step S301, by the microcomputer 31, an actual terminal voltage Vm across the solenoid coil 2, which corresponds to an actual current flowing through the solenoid coil, is acquired by reading a divided voltage between the resistors 327a and 327b. The processing is then shifted to step S302.

At step S302, the read-in terminal voltage Vm is used to determine whether or not some kind of abnormality occurs in association with the solenoid coil 2. If it is determined that the solenoid coil 2 is in order, this determination for the abnormality is repeated at intervals. In contrast, the occurrence of some kind of abnormality is detected, the processing is made to proceed to step S303.

Specifically, the determination at step S302 is carried out based on the following manner. In the present embodiment, when the duty ratio of the PWM signal the microcomputer 31 sends out to the switching transistor 324 is denoted as P [%], the value Vs of voltage that corresponds to a command value of current to flow through the solenoid coil 2 can be calculated on the following formula (3):

$$Vs=V1(1-P/100) \quad (3),$$

wherein V1 is a voltage value of the battery 8.

It is therefore determined that the solenoid coil 2 is normal, if the terminal voltage Vm across the solenoid coil 2 meets a condition defined by the following formula (4):

$$Vs-1.5<Vm<Vs+1.5 \quad (4).$$

In terms of preventing the microcomputer 31 from erroneously determining abnormality of the solenoid coil 2, the condition on the formula (4) is defined. In other words, a voltage range assigned to the normal state is higher than a first voltage value obtained by subtracting a predetermined voltage of 1.5 [V] from the calculated voltage Vs and lower than a second voltage value obtained by adding the predetermined voltage of 1.5 [V] to the calculated voltage Vs.

Hence, in cases where it is found that the value of the terminal voltage Vm across the solenoid coil 2 falls out of the range defined by the formula (4), the microcomputer 31 concludes that the solenoid coil 2 is out of order. In this case, the processing is executed at step S303.

As step S303, another type of abnormality-avoiding processing "C" is executed. In practice, the microcomputer 31 not only issues a signal to turn off the switching transistor 324 but also issues a signal to turn off the six switching transistors for driving the electric motor 4. Furthermore, the microcomputer 31 memorizes information about what kind of abnormality occurs and orders the relay 33 to turn off, thus stopping supplying the current from the battery 8 to the solenoid coil 2. In addition, the microcomputer 31 issues a command to light up a warning lamp (not shown) of a meter on the vehicle's dashboard. Lighting up such a lamp will surely notify the vehicle driver of occurrence of the abnormal state in the solenoid coil 2.

Though the processing at steps S104, S203 and S303, information showing assumed types of abnormality occurring concerning with the solenoid coil 2 is collected into the microcomputer 31. The collected information, which is summarized as table 1, can be used for repair or others.

TABLE 1

| Type of abnormality-avoiding processing | Conditions | Symptoms detected | Contents of assumed abnormality |
| --- | --- | --- | --- |
| A | IG switch 9: ON | Voltage differs from a divide | LV terminal: floating or grounding; |
| | Relay 33: OFF Current drive signal: OFF | voltage between resistors 327a and 327b | LG terminal: floating or grounding |
| B | IG switch 9: ON | Voltage differs from a divide | LV terminal: breaking or grounding; |
| | Relay 33: ON Current drive signal: OFF | voltage between resistors 327a and 327b | LG terminal: breaking or grounding |
| C | IG switch 9: ON | Actual current value differs from command value | LV terminal: breaking or grounding; |
| | Relay 33: ON Current drive signal: ON | | LG terminal: breaking, floating, or ground |

The variable transmission-ratio steering apparatus 1 according to the present embodiment is configured and can be operative, as described above. Hence various advantages can be provided as described below.

The microcomputer 31 draws a comparison between the voltage Vs to be applied to the solenoid coil 2 and the terminal voltage Vm actually applied to the solenoid coil 2 to detect an abnormal state concerning the solenoid coil 2. That is, the microcomputer 31 detect such an abnormal state by comparing a command value of current to flow through the solenoid coil 2 with a current value actually flowing through the solenoid coil 2. Thus it is possible to surely detect the abnormality of the solenoid coil 2. In addition, when the occurrence of some kind of abnormality is detected, the microcomputer 31 takes a countermeasure of issuing an command to turn off the six switching transistors for driving the electric motor 4, thereby immediately stopping driving the electric motor 4. Hence such a situation where the current is kept to flow through the electric motor 4 for a long time can be avoided without fail, whereby the electric motor 4 can be prevented from being overheated.

The actual current that flows through the solenoid coil 2 varies in its amount depending on the voltage of the battery 8. Taking this fact into consideration, the present embodiment adopts a characteristic way of controlling the switching transistor 324 in the solenoid drive circuit 32. Practically, a divided voltage between the resistors 326a and 326b is detected to obtain the voltage of the battery 8, and the obtained battery voltage is used to compute a duty ratio of the PWM signal to be sent to the switching transistor 324. This PWM signal of such a computed duty ratio enables the current flow through the solenoid coil 2 according to a desired command value of current. With minimizing a difference between an actual value and a desired command value of current through the solenoid coil 2, the abnormality which might occur in association with the solenoid coil 2 can be detected without fail.

Furthermore, another advantage stems from a voltage range applied to the determination of whether or not the solenoid coil 2 is in order. The voltage range assigned to the determination for the normal state is higher than a first voltage value obtained by subtracting a predetermined voltage of 1.5 [V] from the calculated voltage Vs and lower than a second voltage value obtained by adding the predetermined voltage of 1.5 [V] to the calculated voltage Vs. If the terminal voltage Vm corresponding to the actual current falls out of the normal voltage range, it is determined that the solenoid coil 2 is out of order. The terminal voltage Vm detected using the resistors 326a and 326b is not always completely equal to the voltage value Vs, because of noise or other unwanted factors. Hence, as above, a certain width is given to the voltage range assigned to the normal state. This is very effective for raising accuracy for determining the abnormality of the solenoid coil 2.

Another advantage concerns obtaining secure steerage. When determining that the solenoid coil 2 is out of order, the microcomputer 31 takes the foregoing abnormality-avoiding processing "C," with which a signal commanding the off-state is given to the switching transistor 324, so that no current is supplied from the battery 8 to the solenoid coil 2. Hence the lock pin 21 is not actuated to retract and the direct lock between the steering wheel 10 and the steerable road wheels 17 can be assured, maintaining the secure steerage.

Various modifications concerning the above configurations are possible. For example, for determining the abnormality of the solenoid coil 2, the amount of current actually flowing through the solenoid coil 2 may be detected by another type of current detector, not limited to the detection circuit described in the foregoing embodiment. When such a current detector is adopted, there is no necessity of arranging the resistors 327a and 327b connected in series to the solenoid coil 2.

The conditions for the determination used at steps S103, S202 and S302 are listed as examples only. Other various modifications can also be added to those determining conditions.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-129559 filed on May 7, 2003 including the specification, claims, drawings and summary is incorporated herein by reference in its entirety.

What is claimed is:

1. A variable transmission-ratio steering apparatus comprising:

an input shaft coupled to a steering wheel;

an output shaft operatively coupled to steerable road wheels;

an electric motor varying a rotation angle of the output shaft by providing a drive force to the output shaft, the drive force being decided based on a rotation angle of the input shaft;

a lock member locking the input shaft to the output shaft in an unlockable manner;

an excitation coil enabling the lock member to be actuated to unlock a lock between the input and output shafts;

a control unit controlling current to be supplied to the excitation coil; and an abnormality detecting unit detecting abnormality of the excitation coil on the basis of both of a command value of current to flow through the excitation coil and a value of the current actually flowing through the excitation coil.

2. The variable transmission-ratio steering apparatus according to claim 1, comprising:

an abnormality-avoiding unit avoiding the abnormality of the excitation coil when the abnormality detecting unit detects the abnormality of the excitation coil.

3. The variable transmission-ratio steering apparatus according to claim 2, comprising:

a power-supply voltage detecting unit detecting a voltage value of a power source to supply the current to the excitation coil, wherein the control unit comprising a supply unit supplying the current to the excitation coil, the current having a duty ratio decided, on the basis of the voltage value of the power source, to allow the current of the command value to flow through the excitation coil.

4. The variable transmission-ratio steering apparatus according to claim 3, wherein the abnormality detecting unit has a resistor electrically coupled to the excitation coil and a calculating unit calculating the value of the current actually flowing through the excitation coil on the basis of a voltage value detected by the resistor.

5. The variable transmission-ratio steering apparatus according to claim 4, wherein the abnormality detecting unit has a calculation unit deciding a normal range of the current actually flowing through the excitation coil on the basis of the current of the command value and determines that the excitation coil is abnormal in cases where the value of the actually flowing current falls out of the normal range.

6. The variable transmission-ratio steering apparatus according to claim 5, wherein the normal range consists of current values larger than a current value calculated by subtracting a predetermined current value from the command value of the current and lower than a current value calculated by adding the predetermine current value to the command value of the current.

7. The variable transmission-ratio steering apparatus according to claim 2, wherein the control unit includes a switching transistor for controlling the current to flow through the excitation coil, and the abnormality-avoiding unit includes means for turning off the switching transistor when the abnormality detecting unit detects the abnormality of the excitation coil.

8. The variable transmission-ratio steering apparatus according to claim 7, comprising:

a power-supply voltage detecting unit detecting a voltage value of a power source to supply the current to the excitation coil, wherein the control unit comprising a supply unit supplying the current to the excitation coil, the current having a duty ratio decided, on the basis of the voltage value of the power source, to allow the current of the command value to flow through the excitation coil.

9. The variable transmission-ratio steering apparatus according to claim 8, wherein the abnormality detecting unit has a resistor electrically coupled to the excitation coil and a calculating unit calculating the value of the current actually flowing through the excitation coil on the basis of a voltage value detected by the resistor.

10. The variable transmission-ratio steering apparatus according to claim 9, wherein the abnormality detecting unit has a calculation unit deciding a normal range of the current actually flowing through the excitation coil on the basis of the current of the command value and determines that the excitation coil is abnormal in cases where the value of the actually flowing current falls out of the normal range.

11. The variable transmission-ratio steering apparatus according to claim 1, comprising:

a power-supply voltage detecting unit detecting a voltage value of a power source to supply the current to the excitation coil, wherein the control unit comprising a supply unit supplying the current to the excitation coil, the current having a duty ratio decided, on the basis of the voltage value of the power source, to allow the current of the command value to flow through the excitation coil.

12. The variable transmission-ratio steering apparatus according to claim 11, wherein the abnormality detecting unit has a resistor electrically coupled to the excitation coil and a calculating unit calculating the value of the current actually flowing through the excitation coil on the basis of a voltage value detected by the resistor.

13. The variable transmission-ratio steering apparatus according to claim 12, wherein the abnormality detecting unit has a calculation unit deciding a normal range of the current actually flowing through the excitation coil on the basis of the current of the command value and determines that the excitation coil is abnormal in cases where the value of the actually flowing current falls out of the normal range.

14. The variable transmission-ratio steering apparatus according to claim 13, wherein the normal range consists of current values larger than a current value calculated by subtracting a predetermined current value from the command value of the current and lower than a current value calculated by adding the predetermine current value to the command value of the current.

15. The variable transmission-ratio steering apparatus according to claim 1, wherein the abnormality detecting unit has a resistor electrically coupled to the excitation coil and a calculating unit calculating the value of the current actually flowing through the excitation coil on the basis of a voltage value detected by the resistor.

16. The variable transmission-ratio steering apparatus according to claim 1, wherein the abnormality detecting unit has a calculation unit deciding a normal range of the current actually flowing through the excitation coil on the basis of the current of the command value and determines that the excitation coil is abnormal in cases where the value of the actually flowing current falls out of the normal range.

17. The variable transmission-ratio steering apparatus according to claim 16, wherein the normal range consists of current values larger than a current value calculated by subtracting a predetermined current value from the command value of the current and lower than a current value calculated by adding the predetermine current value to the command value of the current.

18. A variable transmission-ratio steering apparatus comprising:

an input shaft coupled to a steering wheel;

an output shaft operatively coupled to steerable road wheels;

an electric motor varying a rotation angle of the output shaft by providing a drive force to the output shaft, the drive force being decided based on a rotation angle of the input shaft;

a lock member locking the input shaft to the output shaft in an unlockable manner;

an excitation coil enabling the lock member to be actuated to unlock a lock between the input and output shafts a control unit controlling both of current to be supplied to the excitation coil and current to be supplied to the electric motor;

an abnormality detecting unit detecting abnormality of the excitation coil; and an abnormality-avoiding unit stopping a drive of the electric motor when the abnormality detecting unit detects the abnormality of the excitation coil.

19. The variable transmission-ratio steering apparatus according to claim 18, wherein the control unit includes a switching transistor for controlling the current to flow through the excitation coil, and the abnormality-avoiding unit includes means for turning off the switching transistor when the abnormality detecting unit detects the abnormality of the excitation coil.

* * * * *